United States Patent
Arisoy et al.

(10) Patent No.: US 11,279,023 B2
(45) Date of Patent: Mar. 22, 2022

(54) SYSTEM AND METHOD FOR DETERMINING GRASPING POSITIONS FOR TWO-HANDED GRASPS OF INDUSTRIAL OBJECTS

(71) Applicant: Siemens Industry Software Inc., Plano, TX (US)

(72) Inventors: Erhan Arisoy, Princeton, NJ (US); Guannan Ren, Monmouth Junction, NJ (US); Rafael Blumenfeld, Raanana (IL); Ulrich Raschke, Ann Arbor, MI (US); Suraj Ravi Musuvathy, Princeton, NJ (US)

(73) Assignee: Siemens Industry Software Inc., Plano, TX (US)

( * ) Notice: Subject to any disclaimer, the term of this patent is extended or adjusted under 35 U.S.C. 154(b) by 248 days.

(21) Appl. No.: 16/472,689

(22) PCT Filed: Feb. 28, 2017

(86) PCT No.: PCT/US2017/019890
§ 371 (c)(1),
(2) Date: Jun. 21, 2019

(87) PCT Pub. No.: WO2018/160163
PCT Pub. Date: Sep. 7, 2018

(65) Prior Publication Data
US 2019/0366539 A1    Dec. 5, 2019

(51) Int. Cl.
*B25J 9/16*    (2006.01)
(52) U.S. Cl.
CPC ... *B25J 9/1612* (2013.01); *G05B 2219/33027* (2013.01); *G05B 2219/39536* (2013.01);
(Continued)

(58) Field of Classification Search
CPC ........................................................ B25J 9/16
See application file for complete search history.

(56) References Cited

U.S. PATENT DOCUMENTS

| 10,607,413 B1 * | 3/2020 | Marcolina | ............... G06F 3/017 |
| 2008/0133058 A1 * | 6/2008 | Ohno | .................... B25J 9/1612 |
| | | | 700/259 |

(Continued)

FOREIGN PATENT DOCUMENTS

| CN | 101283378 | 10/2008 |
| CN | 102282561 | 12/2011 |

(Continued)

OTHER PUBLICATIONS

Aydin et al.; "Database guided computer animation of human grasping using forward and inverse kinematics" Computers & Graphics; 1999; 23(1); pp. 145-154.

(Continued)

*Primary Examiner* — Kira Nguyen

(57) ABSTRACT

A system and method is provided for determining grasping positions for two-handed grasps of industrial objects. The system may include a processor configured to determine a three dimensional (3D) voxel grid for a 3D model of a target object. In addition, the processor may be configured to determine at least one pair of spaced apart grasping positions on the target object at which the target object is capable of being grasped with two hands at the same time based on processing the 3D voxel grid for the target object with a neural network trained to determine grasping positions for two-handed grasps of target objects using training data. Such training data may include 3D voxel grids of a plurality of 3D models of training objects and grasping data including corresponding pairs of spaced-apart grasping positions for two-handed grasps of the training objects. Also, the proces- (Continued)

sor may be configured to provide output data that specifies the determined grasping positions on the target object for two-handed grasps.

20 Claims, 4 Drawing Sheets

(52) U.S. Cl.
CPC .............. *G05B 2219/39543* (2013.01); *G05B 2219/40442* (2013.01)

(56) References Cited

U.S. PATENT DOCUMENTS

| | | | |
|---|---|---|---|
| 2013/0005420 A1* | 1/2013 | Ueno | A63F 13/213 463/9 |
| 2013/0225250 A1* | 8/2013 | Tudosoiu | H01Q 1/2266 455/575.7 |
| 2015/0343641 A1* | 12/2015 | Maruyama | B25J 9/1697 700/259 |
| 2016/0279791 A1* | 9/2016 | Watanabe | G06K 9/00201 |
| 2018/0272535 A1* | 9/2018 | Ogawa | B25J 19/023 |

FOREIGN PATENT DOCUMENTS

| | | |
|---|---|---|
| CN | 103271784 | 9/2013 |
| EP | 2712715 A2 | 4/2014 |
| JP | H0639884 | 12/1994 |

OTHER PUBLICATIONS

Corey Goldfeder et al: "Data-driven grasping", Autonomous Robots, Kluwer Academic Publishers, BO, vol. 31, No. I, Apr. 15, 2011, pp. 1-20.

Li et al.; "Finding enveloping grasps by matching continuous surfaces"; In Robotics and Automation (ICRA); IEEE; 2011 International Conference on, IEEE, pp. 2825-2830.

Touvet et al.; "A biomimetic reach and grasp approach for mechanical hands". Robot. Auton. Syst.; 2012; 60 (3); pp. 473-486.

Sahbani et al.; "An overview of 3d object grasp synthesis algorithms"; Robotics and Autonomous Systems; 2012; 60 (3); pp. 326-336.

Zhao et al.; "Robust real-time physics-based motion control for human grasping"; ACM Trans. Graph.; 2013; 32(6); pp. 207:1-207:12.

Vasundara et al.; "Recent developments on machining fixture layout design, analysis, and optimization using finite element method and evolutionary techniques"; The International Journal of Advanced Manufacturing Technology; 2013; 70(1); pp. 79-96.

Wang et al.; "Precision localization and robust force closure in fixture layout design for 3d workpieces". Robotics and Automation, Proceedings, ICRA '00, IEEE International Conference; 2000; vol. 4; pp. 3585-3590.

Zheng et al.; "Efficient simplex computation for fixture layout design"; Computer-Aided Design; 2011; 43(10); pp. 1307-1318; Solid and Physical Modeling 2010.

El-Khoury et al; "Learning the natural grasping component of an unknown object"; In Intelligent Robots and Systems, IROS, IEEE/RSJ International Conference; 2009; pp. 2957-2962.

Sahbani et al.; "A hybrid approach for grasping 3d objects"; In Intelligent Robots and Systems, IROS, IEEE/RSJ International Conference; 2009; pp. 1272-1277.

Ying et al.; "Data-driven grasp synthesis using shape matching and task-based pruning"; Visualization and Computer Graphics, IEEE Transactions; 2007; 13(4); pp. 732-747.

Yamane et al.; "Synthesizing animations of human manipulation tasks"; ACM Trans. Graph.; 2004; 23(3); pp. 532-539.

Kim et al.; "Shape2pose: Human-centric shape analysis"; ACM Trans. Graph.; 2014; 33(4); pp. 120:1-120:12.

Ye et al.; "Synthesis of detailed hand manipulations using contact sampling"; ACM Transactions on Graphics (TOG); 2012; 31(4); p. 41.

Zheng et al.; "On computing reliable optimal grasping forces"; Robotics, IEEE Transactions; 2012; 28(3); pp. 619-633.

Chinellato et al.; "Ranking planar grasp configurations for a threefinger hand"; Robotics and Automation, Proceedings, ICRA 03, IEEE International Conference; 2003; vol. 1; pp. 1133-1138.

Roa et al.; "Grasp quality measures: review and performance"; Autonomous Robots; 2014; 38(1); pp. 65-88.

Erhan Batuhan Arisoy et al: "A Data-Driven Approach to Predict Hand Positions for Two-Hand Grasps of Industrial Objects", vol. 1A: 36th Computers and Information in Engineering Conference, vol. 21, Aug. 21-24, 2016, pp. 1-10.

Wu et al.; "3d shapenets: A deep representation for volumetric shapes"; Proceedings of the IEEE Conference on Computer Vision and Pattern Recognition; 201, pp. 1-9.

Jia et al.; "Caffe: Convolutional architecture for fast feature embedding"; Proceedings of the 22nd ACM international conference on Multimedia, ACM; 2014, pp. 1-4.

Lerrel Pinto et al: "Supersizing self-supervision: Learning to grasp from 50K tries and 700 robot hours", Sep. 23, 2015, pp. 1-8.

I. Lenz et al: "Deep learning for detecting robotic grasps", International Journal of Robotics Research., vol. 34, No. 4-5, Mar. 16, 2015, pp. 705-724.

PCT International Search Report and Written Opinion of International Searching Authority dated Nov. 17, 2017 corresponding to PCT International Application No. PCT/US2017/019890 filed Feb. 28, 2017.

CN office action dated Dec. 3, 2021, for CN Application No. 201780081644X, 8 pages.

* cited by examiner

SYSTEM AND METHOD FOR DETERMINING GRASPING POSITIONS FOR TWO-HANDED GRASPS OF INDUSTRIAL OBJECTS

TECHNICAL FIELD

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

BACKGROUND

Product systems may be used to simulate manufacturing systems and processes. Such systems may benefit from improvements.

SUMMARY

Variously disclosed embodiments include data processing systems and methods that may be used to facilitate determining grasping positions for two-handed grasps of industrial objects. In one example, a system may comprise at least one processor configured to determine a three dimensional (3D) voxel grid for a 3D model of a target object. The at least one processor may also be configured to determine at least one pair of spaced apart grasping positions on the target object at which the target object is capable of being grasped with two hands at the same time based on processing the 3D voxel grid for the target object with a neural network trained to determine grasping positions for two-handed grasps of target objects using training data. Such training data may include 3D voxel grids of a plurality of 3D models of training objects and grasping data including corresponding pairs of spaced-apart grasping positions for two-handed grasps of the training objects. In addition, the at least one processor may be configured to provide output data that specifies the determined grasping positions on the target object for two-handed grasps.

In another example, a method for predicting hand positions for two-hand grasps of industrial objects may comprise several acts carried out through operation of at least one processor that correspond to the functions for which the previously described at least one processor is configured to carry out.

A further example may include a non-transitory computer readable medium encoded with executable instructions (such as a software component on a storage device) that when executed, causes at least one processor to carry out this described method.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
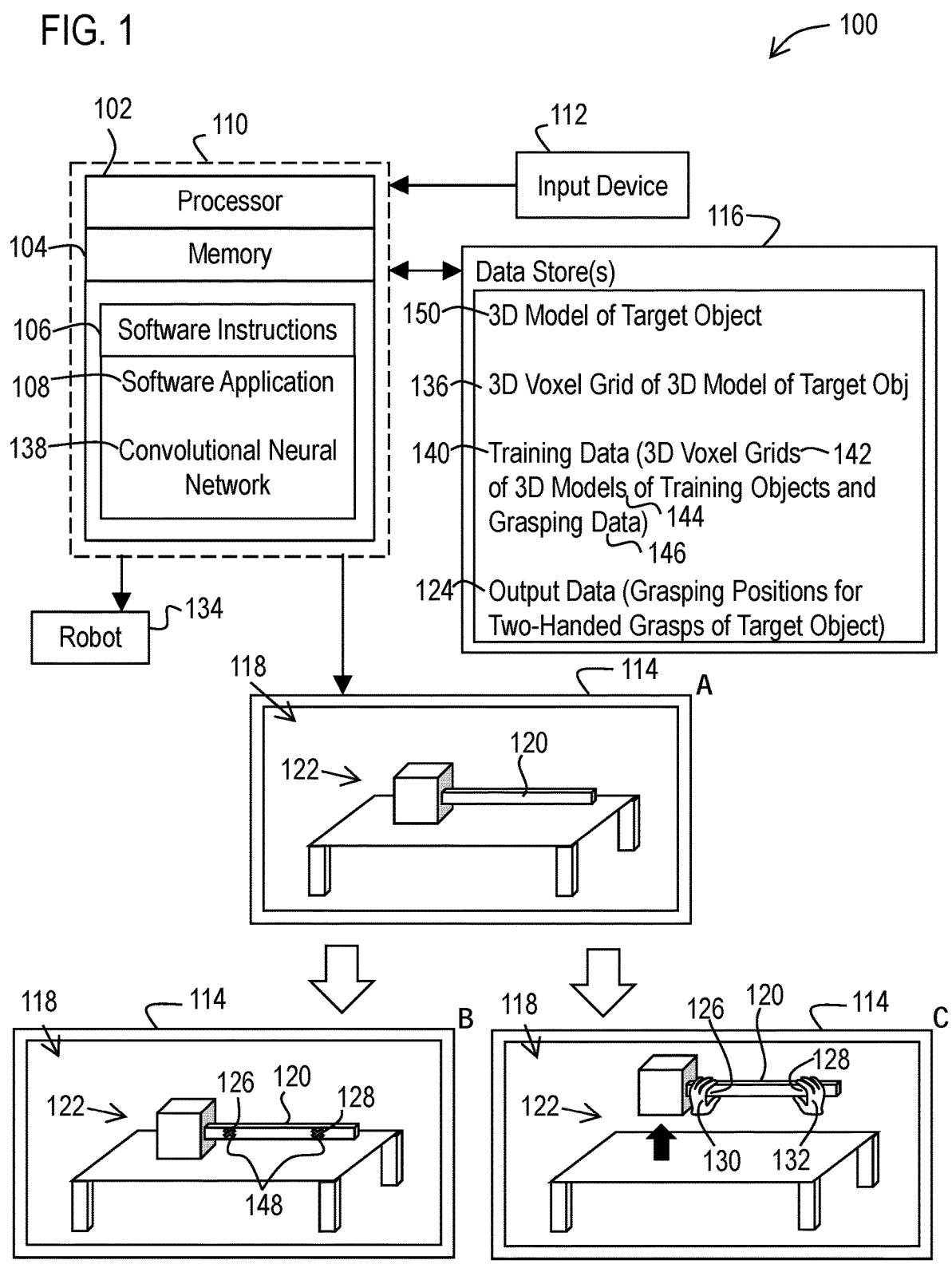
FIG. 1 illustrates a functional block diagram of an example system that facilitates determining grasping positions for two-handed grasps of industrial objects.

Various technologies that pertain to systems and methods that facilitate determining grasping positions for two-handed grasps of industrial objects will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example data processing system 100 is illustrated that facilitates carrying out one or more of the embodiments described herein. The system 100 may include at least one processor 102 (e.g., a microprocessor/CPU) that is configured to carry out various processes and functions described herein by executing software instructions 106 corresponding to one or more software applications 108 or portions thereof that are programmed to cause the at least one processor to carry out the various processes and functions described herein. The software instructions may be accessed by the processor from a memory 104. Such a memory 104 may correspond to an internal or external volatile memory (e.g., main memory, CPU cache, and/or RANI), that is included in the processor and/or in operative connection with the processor. Such a memory 104 may also correspond to a nonvolatile memory (e.g., flash memory, SSD, hard drive, or other storage device or non-transitory computer readable media) in operative connection with the processor.

It should be understood that a processor that is described or claimed as being configured to carry out a particular described/claimed process or function may correspond to the combination 110 of the processor 102 with the software instructions 106 loaded/installed into the described memory 104 (volatile and/or non-volatile), which are currently being executed and/or are available to be executed by the processor to cause the processor to carry out the described/claimed process or function. Thus a processor that is powered off or is executing other software, but has the described software instructions installed on a storage device in operative connection therewith (such as a hard drive or SSD) in a manner that is setup to be executed by the processor (when started by a user, hardware and/or other software), may also correspond to the described/claimed processor that is configured to carry out the particular processes and functions described/claimed herein.

Further, it should be understood that a processor that is described or claimed as being configured to carry out a particular described/claimed process or function may correspond to a microprocessor that is hard wired (e.g., an FPGA or ASIC microprocessor) and/or includes firmware programmed to carry out such a described/claimed process or function.

The described data processing system 100 may include at least one input device 112 and at least one display device 114 in operative connection with the processor. The input device, for example, may include a mouse, pointer, touch screen, touch pad, drawing tablet, track ball, buttons, keypad, keyboard, camera, motion sensing device that captures motion gestures, and/or any other type of input device capable of providing the inputs described herein. The display device, for example, may include an LCD display screen, monitor, VR headset, and/or a projector. For example, the processor 102, memory 104, software instructions 106, input device 112, and display device 114, may be included as part of a data processing system corresponding to a PC, workstation, server, notebook computer, tablet, mobile phone, or any other type of computing system, or any combination thereof.

The data processing system 100 may also include one or more data stores 116. The processor 102 may be configured to retrieve, generate, use, revise, and store product data and/or other information described herein from/in the data store 116. Examples of a data store may include a database (e.g., Oracle, Microsoft SQL Server), file system, hard drive, SSD, memory card and/or any other type of device or system that stores non-volatile data.

In example embodiments, the software application 108 may include PLM software applications that may be adapted to carry out the processes and functions described herein. Examples of such PLM software may include human simulation software such as Tecnomatix Jack human simulation software, available from Siemens Product Lifecycle Management Software Inc., of Plano, Tex., US. However, it should be appreciated that the systems and methods described herein may be used in other product systems, digital factory simulation systems, controllers that operate machines in factories, and/or any other type of system that generates, uses, and/or stores product data.

Such PLM software applications may be configured to generate, revise, manipulate, output, display, store, and/or use 3D models 150 (e.g., data specifying mathematical representations of a 3D volume/surface of objects such as solid models and shell/boundary models). Such 3D model data may be stored in the data store 116 and/or in files (e.g., in a CAD format such as JT or STEP, or other format for storing geometric curves that define the shape of the part). In addition, it should also be appreciated that the 3D model data may be generated from a 3D scan of an existing physical part.

3D models 150 may be used by PLM software applications such as Tecnomatix Jack to display through a display device 114 3D visual representations 122 of target objects 120 corresponding to the 3D models 150 in a simulated 3D environment (see view A in FIG. 1). It should also be understood that a 3D representation or 3D visualization of a 3D model of a target object or other components in a 3D environment may be carried out via a 2D display screen by illustrating components in a perspective or orthogonal view. Also, it should be appreciated that alternative embodiments may employ 3D display screens and/or a virtual reality headset to enhance the 3D perception of the 3D visual representation of the 3D model.

Such a simulated 3D environment may involve the simulation of people, machines, and/or robots in order to carry out one or more activities. Such simulations, for example, may be used by designers of factories such as manufacturing facilities to study and manipulate the ergonomics of a manufacturing process in which objects are grasped by two hands by a person, machine, and/or robot. As used herein the term "hand" is to be construed broadly as corresponding to any device capable of grasping an object such as a human hand, a robotic hand, a clamp, a vice, and/or any other type of mechanism that can grasp an object in order to move the object and/or to resist forces acting to move the object.

Such a software application 108 may generate an interactive graphical user interface (GUI) 118 through a display device 114 depicting a 3D simulation of a factory floor (or other location), in which the target object 120 may be selected (via an input through an input device 112) to be grasped via a two-handed grasp by the hands of a human, robot, or other machine depicted in the simulation. In response to such a selection, the application 108 may be configured to determine at least one pair of spaced-apart grasping positions on the selected target object and provide output data 124 that specifies the determined grasping positions. In an example embodiment, providing the output data may include the software application 108 causing the display device 114 (see view B in FIG. 1) to display markings 148 at the spaced-apart grasping positions 126, 128 on the target object at which the target object may be grasped via a two-handed grasp by a human, robot, or other machine grasping the target object at the determined spaced-apart grasping positions.

In addition, or alternatively the output data 124 may be provided to a portion of the software application 108 that is configured to cause the display device 114 (see view C in FIG. 1) to display a 3D simulation of hands 130, 132 of a person, robot or other machine grasping the target object 120 with a two-handed grasp at the determined grasping positions 126, 128 and holding and/or moving the target object. A possible objective of such a simulation with respect to human hands may be to produce a visual animation of the two-handed grasp of the target object in a 3D simulation of a factory that includes relatively more natural looking grasping motions. Also with respect to robots or other machines, such a software application 108 may include a manufacturing simulation component that may be configured to simulate the control of a physical robot or other machine to grasp a target object in order to simulate a fixture design process that examines holding mechanical objects firmly in place with two-handed grasps during manufacturing processes.

In another example, the described software application 108 may include a component corresponding to a controller application that is configured to control a physical robot 134 or other machine to grasp a target object on a conveyer belt, assembly line, bin, or other location. In response to the detection of such a target object, the controller application may be configured to determine grasping positions for two-handed grasps on the detected target object and provide output data 124 that specifies the determined grasping positions. Providing the output data may include sending commands via the controller to cause the robot or other machine to move to grasp the object via a two-handed grasp at the specified spaced-apart locations on the target object.

One approach to determine two-handed grasp locations on target objects may be to use physics based methods. In physics based methods, the main idea may be to find a set of feasible contact points that is optimum in terms of a pre-defined quality measure. One example may include a method that selects grasp points that minimize the contact forces. In another example, geometrical constraints may be used based on a grasp polygon in order to evaluate the feasible point sets for an object. Such geometrical approaches may calculate good candidate grasping locations by solving force-balance equations. However, these described methods may not be able to provide solutions that are consistent with the way humans are interacting with objects in real life.

In another approach, data-driven methods may be used to capture human decision making in grasping process. In one data-driven approach, objects in a database may be represented as combinations of simple primitive shapes (such as cylinder, ellipsoid, and cuboid), and shape matching methods may be employed to determine corresponding suitable grasping poses for an object to be manipulated. Another data-drive approach may be based on data sets that include estimated contact points associated with a 3D model. Such contact points may be determined using experiments involving sensors that capture the actual positions that humans or robots grasp similar objects. However, such a method for determining two-handed grasping locations may be limited by the small sample size of the experiment, and thus be limited to a corresponding small subset of object types.

In order to provide a relatively more expansive solution for use with human and/or robot grasps and/or grasping simulations, an example embodiment (described in more detail below) may employ an end-to-end deep learning framework that uses a convolutional neural network (or other type of neural network that can be trained using 3D image data) to determine at least one pair of spaced-apart grasping positions on a target object at which the target object is capable of being grasped with two hands at the same time. This example may be capable of determining grasping positions for two-handed grasps for relatively larger sets of real-life objects, which positions are relatively more consistent with the way humans typically interact with real-life objects.

In this described example the described target object 120 may be associated with a 3D model 150 that is stored in the data store 116. The processor may be configured to retrieve/receive the 3D model 150 (e.g., CAD data) of the particular target object for which a determination of a pair of grasping positions for two-handed grasps is desired, such as in response to a selection and/or detection of a target object by the software application 108 in a process that involves simulating a two-handed grasp of the target object.

The processor 102 may be configured to determine a 3D voxel grid 136 for the 3D model 150 of the target object 120. For example, the processor may then be configured to generate the 3D voxel grid 136 via a subdivision process that subdivides the 3D model 150 into a plurality of smaller 3D elements or cells that are referred to herein as voxels. Such voxels may be stored as a 3D voxel grid (i.e., voxel image) in memory 104 and/or the data store 116, in which the position of each voxel is inferred based upon its position relative to other voxels. In an example embodiment, each voxel may have a uniform shape such as a cube, rectangular prism, hexahedron, or other 3D block shape.

The processor 102 may also be configured to determine at least one pair of grasping positions 126, 128 on the target object 120 at which the target object is capable of being grasped with two hands 130, 132 at the same time based on processing the 3D voxel grid 136 for the target object with a convolutional neural network 138 (or other neural network). Such a convolutional neural network may be trained to determine grasping positions for two-handed grasps of objects using training data 140 including 3D voxel grids 142. Such 3D voxel grids for the training data may be generated by forming voxel grids of a plurality of 3D models 144 of training objects and grasping data 146 including corresponding pairs of spaced-apart grasping positions for two-handed grasps of the training objects. Based on the grasping positions for the target object that were determined using the convolutional neural network, the processor 102 may be configured to provide the previously described output data 124 that specifies the determined grasping positions for two-handed grasps of the target object.

As discussed previously, such output data 124 may be provided via an output through a display device 114 that includes a 3D visual representation 122 of the target object 120 based on the 3D model 150 including markings 148 that visually highlight the determined grasping positions 126, 128 for the target object. Also, as discussed previously, such output data 124 may be provided to a portion of the software application 108 that is configured to cause the processor 102 to generate a 3D simulation of at least one of a person or a robot grasping the target object with a two handed-grasp with two hands 130, 132 at the determined grasping positions 126, 128.

Figure 2:
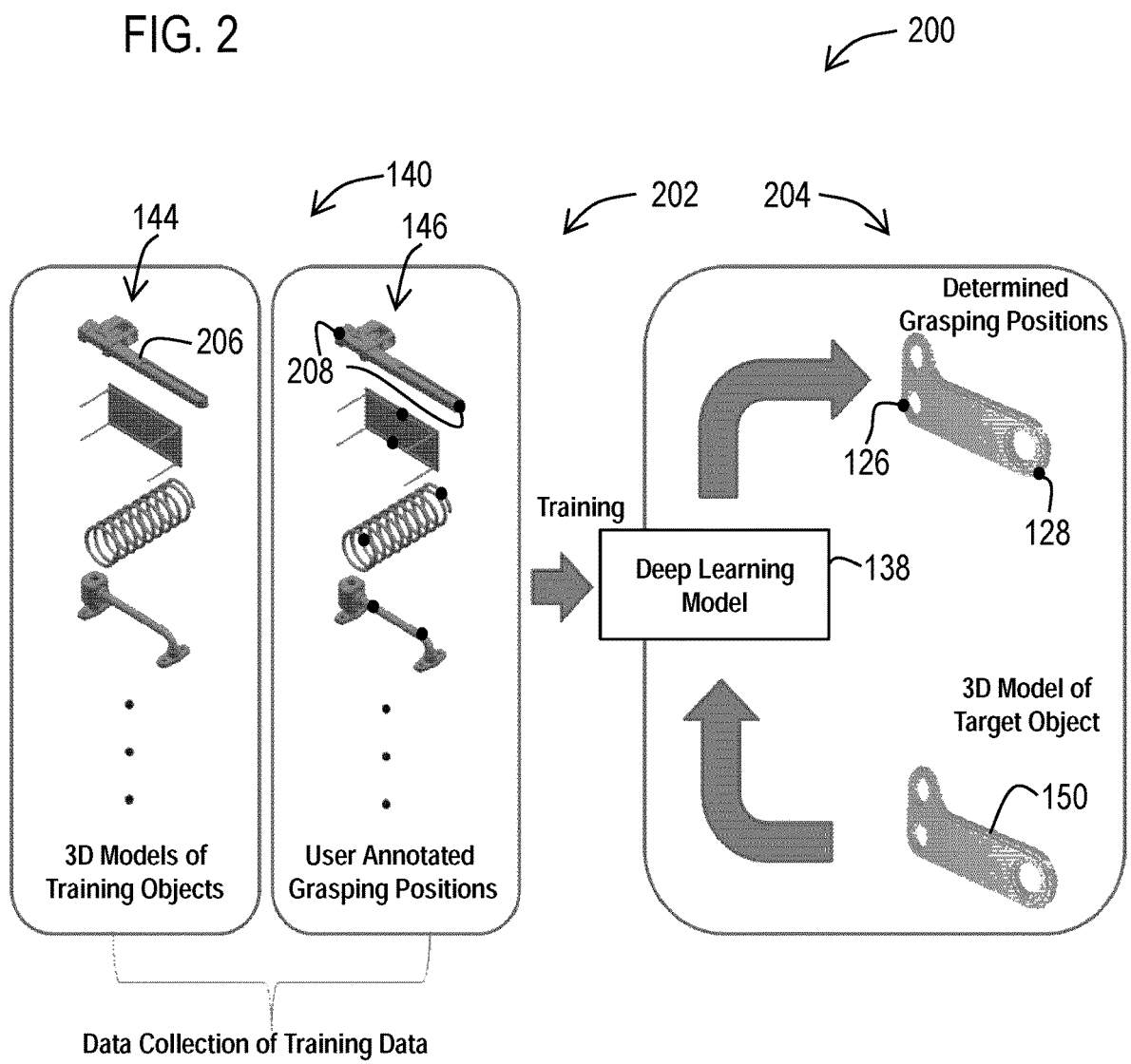
FIG. 2 illustrates an example framework for training a neural network to be usable to determine grasping positions for two-handed grasps of industrial objects.

FIG. 2 illustrates an example framework 200 for carrying out the above-described approach to determining grasping locations for a target object. This example framework may include first and second stages 202, 204. The first stage may correspond to a training phase where the convolutional neural network 138 is trained using training data 140. Such training data may be collected via crowd-sourcing involving many users.

To collect training data, users may be presented (via a training GUI through a display device) a visual representation of a wide variety of 3D models 144 of training objects 206 (e.g., CAD models for common household objects and/or less commonly known industrial objects). The training GUI may prompt the users to provide grasping data 146 via an input device (e.g., via markings and/or selections on portions of the visual representations of the training objects 206) specifying grasping positions 208 that they think are good candidate positions for grasping the depicted object with two-handed grasps. These training 3D models 144 may be converted into 3D voxel grids. Such 3D voxel grids for the 3D models 144 of training objects may have voxels with a value of 1 (or other values) for the space occupied by the training object depicted in the 3D model. The remaining voxels in the 3D voxel grids for the 3D models 144 (for places other than the space occupied by the training object)

may have a value of 0 (or other value that is in contrast to the value for voxels corresponding to the space occupied by the training object).

Also, the user provided grasping data 146 for each 3D model may similarly be represented in a 3D voxel grids (e.g., having a bounding box with the same shape and orientation as the 3D voxel grid for the corresponding 3D model). Such 3D voxel grids for the grasping data may have voxels with a value of 1 (or other value) for the positions labeled by the user as good grasping regions on the original 3D models. The remaining voxels in the 3D voxel grids for the grasping data 146 (for places other than grasping positions) may have a value of 0 (or other value that is in contrast to the value for voxels corresponding to grasping positions).

In order to train the convolutional neural network 138, an example embodiment may use a deep learning model software tool such as the Caffe open source toolbox. Such a software tool may take as input the training 3D voxel grids 142 comprising the 3D voxel grids of the 3D models 144 of the training objects 206 and the corresponding 3D voxel grids of the grasping data 146 that were collected from multiple users.

The second stage 204 of the described example framework 200 corresponds to use of the trained convolutional neural network to determine grasping positions 126, 128 for two-handed grasps for a given 3D model 150 of a target object. In this step, a 3D voxel grid 136 of the 3D model 150 of the target object may be produced in a manner corresponding to the manner that the 3D voxel grids of the training object were produced. For example, voxels in a 3D voxel grid for the target object may be represented by a value of 1 (or other values) for the space occupied by the target object depicted in the 3D model. The remaining voxels in the 3D voxel grid for the 3D model 150 (for places other than the space occupied by the target object) may have a value of 0 (or other value that is in contrast to the value for voxels corresponding to the space occupied by the target object).

In an example embodiment, the processor may provide the 3D voxel grid of the target object as an input to the trained convolutional neural network. In response to evaluating the 3D voxel grid of the target object, the neural network may provide an output in the form of a voxel grid that depicts determined grasping positions, where the voxels for at least one pair of good grasping positions for two-handed grasps are labeled with a value of 1 (or other value) such as described previously with respect to the user provided training grasping data.

In further example embodiments, the outputted 3D voxel grid may depict more than one pair of spaced-apart grasping positions for two handed grasps. For example, based on the training data (in which different people differ on the best way to grasp objects), the convolutional neural network may determine desirability probabilities for different pairs of grasping positions of a target object. In such an embodiment, the outputted 3D voxel grid may include voxels that specify at least two different pairs of spaced apart positions for two-handed grasps. The values of the voxels may vary in value (rather than having the same value) in order to correspond to an intensity level that reflects which of the pairs of grasping positions is more highly preferred than the other pairs. The software application may then base which pair of grasping locations to use in a simulation based on the intensity values of the voxels and/or other factors associated with the simulation for which the grasping data is being used.

This described deep learning architecture does not require hand-engineered features for learning the two-hand grasping problem. Instead, this described architecture may use a crowd-sourced approach (using training data from multiple users) for determining grasp locations on various geometric objects and generating a training database therefrom. This approach can be applied not only to everyday objects (e.g., tables, plates, glasses), but also mechanical objects found in a factory environment (e.g., components of a manufactured product, tools used to assembly the product), that people or robots may interact with. The described process may be applied to a wide range of simulation applications where the prediction of grasp interface points is desired, including robotic grasping, factory floor simulation, human simulation and human-robot interaction applications. This described process may also enable such systems to make intelligent predictions, drawing on crowd-sourced knowledge of how similar objects are grasped, and extend it to new target 3D objects.

The crowd-sourced approach may more comprehensively identify good grasping locations than what is reasonably achievable using geometric shape analysis algorithms. For example, material weight distribution information, contours, holes, shapes, sharp edges and similar characteristics may be difficult to identify algorithmically, but may be readily observed and considered by user's experience interacting with similar objects during the crowd-sourced learning process. Further, the relatively easier described method at which training data can be provided (via marking grasping positions on a 3D model to produce 3D voxel grids for training objects), enables the production of a large set of training data in much less time compared to data driven approaches involving sensors and experiments of people grasping physical objects. Thus, compared to other approaches, the described framework 200 may be operative to determine two handed grasps for a target object that more closely matches how a human would grasp the object in a real-world factory setting.

In addition, further example embodiments may be configured to incorporate material weight distribution information for training objects and target objects so that the described convolutional neural network can identify grasping locations by taking into account the weight distribution of the target object. For example, the described 3D voxel representation of objects may include different values based on the material type and/or density associated with the material depicted in the CAD models at the position of the voxel. In order to train the convolutional neural network to take into account material/density, the previously described training GUI may provide a visual representation of a training object, which visually depicts and/or labels different materials of which the training object is comprised.

Figure 3:
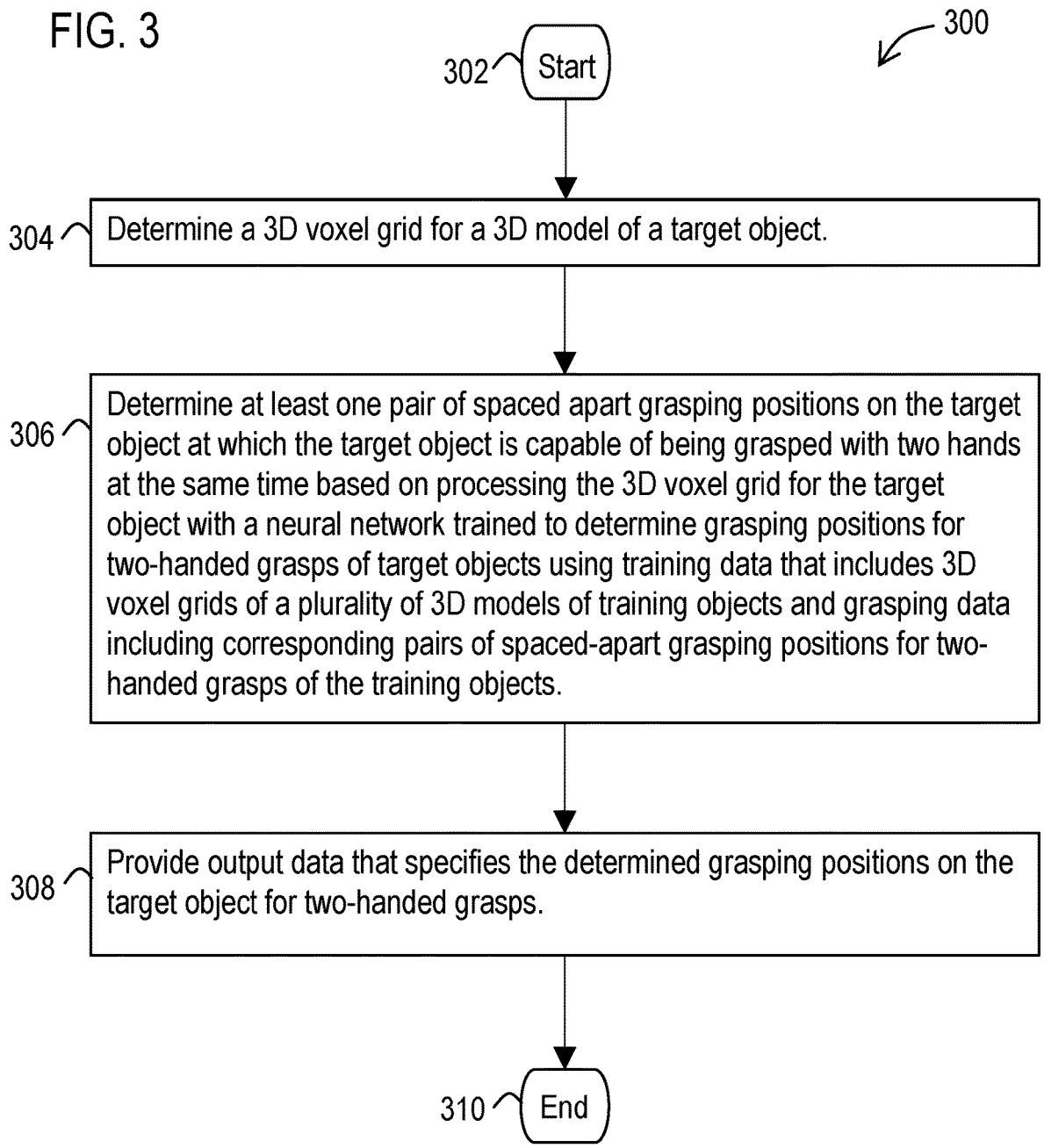
FIG. 3 illustrates a flow diagram of an example methodology that facilitates determining grasping positions for two-handed grasps of industrial objects.

With reference now to FIG. 3, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer-executable instructions may include a routine, a sub-routine, programs, applications, modules, libraries, and/or the like. Still further, results of acts of the methodologies may be stored in a computer-readable medium, displayed on a display device, and/or the like.

Referring now to FIG. 3, a methodology 300 is illustrated that facilitates determining grasping positions for two-handed grasps of industrial objects. The methodology may start at 302 and may include several acts carried out through operation of at least one processor. These acts may include an act 304 of determining a 3D voxel grid for a 3D model of a target object. In addition these act may include an act 306 of determining at least one pair of spaced apart grasping positions on the target object at which the target object is capable of being grasped with two hands at the same time based on processing the 3D voxel grid for the target object with a neural network trained to determine grasping positions for two-handed grasps of target objects using training data. Such training data may include 3D voxel grids of a plurality of 3D models of training objects and grasping data including corresponding pairs of spaced-apart grasping positions for two-handed grasps of the training objects. In addition, the methodology may include an act 308 of providing output data that specifies the determined grasping positions on the target object for two-handed grasps. At 310 the methodology may end.

Also, it should be appreciated that this described methodology may include additional acts and/or alternative acts corresponding to the features described previously with respect to the data processing system 100.

For example, as discussed previously the neural network may be a convolutional neural network. In addition, the output data may include a three dimensional (3D) voxel grid that includes voxels with values that specify at least one pair of grasping positions for two-handed grasps. Further, the methodology may include an act of causing a display device to output a visual representation of the target object including markings that visually highlight the determined grasping positions for the target object.

In further example embodiments, the methodology may include an act of receiving at least one input through at least one input device of a selection of the target object displayed in a 3D simulation of a factory through a display device. In response to the at least one input, the 3D voxel grid of the 3D model of the target object is determined, the grasping positions are determined, and the output data is provided to enable a visual representation of a person to be depicted in the 3D simulation as grasping and moving the target object with two hands at the determined grasping positions.

In addition, the methodology may include an act of providing a user interface via which users are enabled to provide grasping data via inputs through at least one input device corresponding to positions on the plurality 3D models of the training objects corresponding to grasping positions for two-handed grasps. Further, the methodology may include an act of generating training data including 3D voxel grids for both the 3D models of the training objects and the corresponding user provided grasping data, which are usable to train the neural network to determine grasping positions for two-handed grasps of target objects.

In some example embodiments, for at least some target objects, the corresponding output data may specify at least two different pairs of spaced-apart positions for two-handed grasps. Also, in some example embodiments, the 3D voxel grids depicting the training objects and the target object may include voxels that represent material type, density of material, or any combination thereof based on the material type or density of material specified in the 3D model for the portion of the training object or target object represented by each respective voxel.

As discussed previously, acts associated with these methodologies (other than any described manual acts) may be carried out by one or more processors. Such processor(s) may be included in one or more data processing systems, for example, that execute software components (including software instructions) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software code/environments/languages/compilers/frameworks such as with respect to machine code, assembly language, Java, JavaScript, Python, C, C#, C++ or any other software tool capable of producing software components and user interfaces configured to carry out the acts and features described herein.

Figure 4:
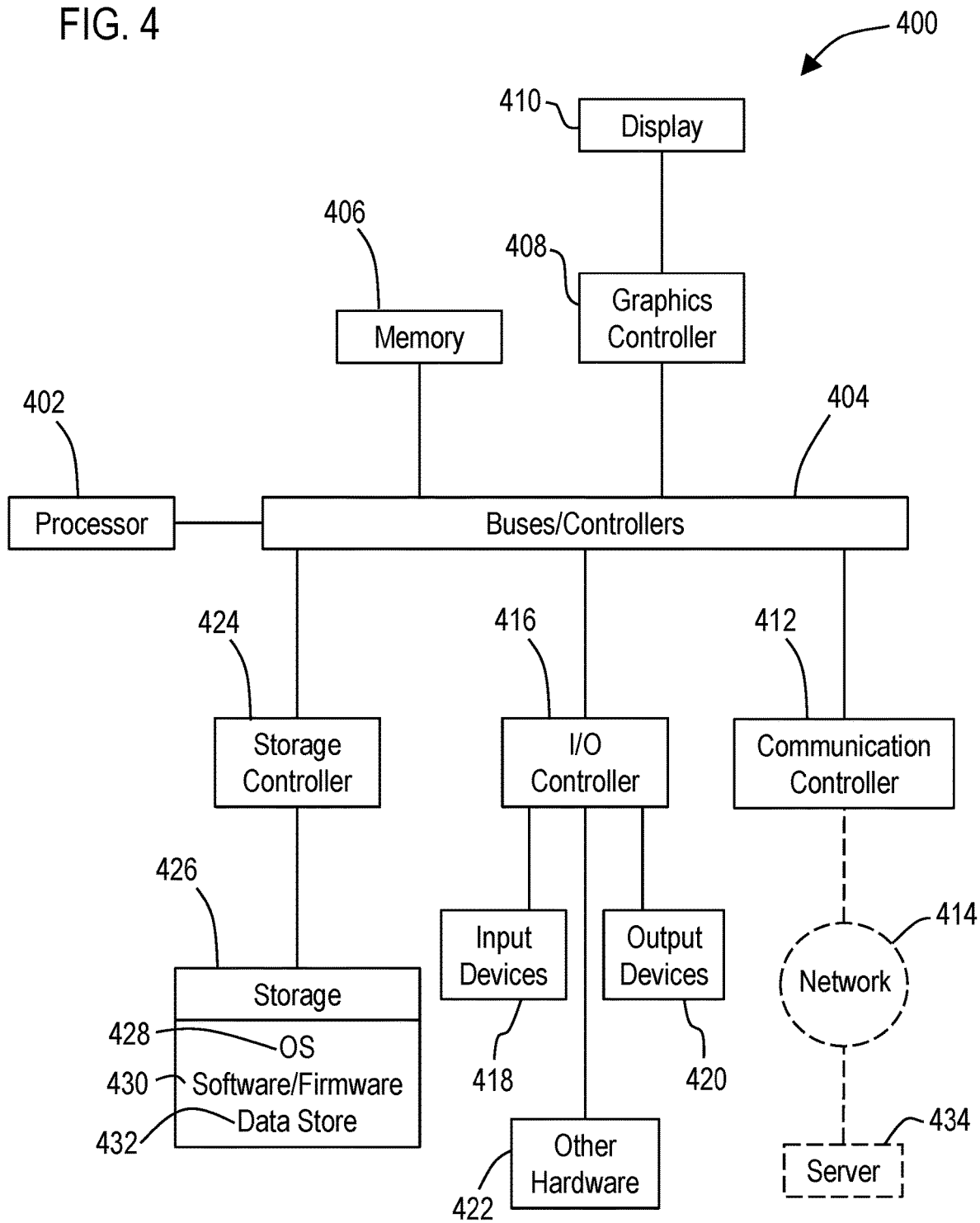
FIG. 4 illustrates a block diagram of a data processing system in which an embodiment may be implemented.

FIG. 4 illustrates a block diagram of a data processing system 400 (e.g., a computer system) in which an embodiment can be implemented, for example, as a portion of a product system, and/or other system operatively configured by software or otherwise to perform the functions and processes as described herein. The data processing system depicted includes at least one processor 402 (e.g., a CPU) that may be connected to one or more bridges/controllers/buses 404 (e.g., a north bridge, a south bridge). One of the buses 404, for example, may include one or more I/O buses such as a PCI Express bus. Also connected to various buses in the depicted example may include a main memory 406 (RAM) and a graphics controller 408. The graphics controller 408 may be connected to one or more display devices 410 (e.g., LCD display screen, monitor, VR headset, and/or projector). It should also be noted that the processor 402 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 412 (Ethernet controllers, WiFi controllers, cellular controllers) operative to connect to a local area network (LAN), Wide Area Network (WAN), a cellular network, and/or other wired or wireless networks 414 or communication equipment.

Further components connected to various busses may include one or more I/O controllers 416 such as USB controllers, Bluetooth controllers, and/or dedicated audio controllers (connected to speakers and/or microphones). It should also be appreciated that various peripherals may be connected to the I/O controller(s) (via various ports and connections) including input devices 418 (e.g., keyboard, mouse, pointer, touch screen, touch pad, drawing tablet, trackball, buttons, keypad, game controller, gamepad, camera, microphone, scanners, motion sensing devices that capture motion gestures), output devices 420 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 402 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 422 connected to the I/O controllers 416 may include any type of device, machine, or component that is configured to communicate with a data processing system.

Additional components connected to various busses may include one or more storage controllers 424 (e.g., SATA). A storage controller may be connected to a storage device 426 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 404 such as a PCI Express bus.

A data processing system in accordance with an embodiment of the present disclosure may include an operating system 428, software/firmware 430, and data stores 432 (that may be stored on a storage device 426 and/or the memory 406). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 412 may be connected to the network 414 (which may or may not be a part of a data processing system 400), which can be any local, wide area, remote, private, and/or public data processing system network or combination of networks, as known to those of skill in the art, including the Internet. Data processing system 400 can communicate over the network 414 with one or more other data processing systems such as a server 434 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 402 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 400 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device. Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 400 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for facilitate determining grasping positions for two-handed grasps of industrial objects comprising:
   at least one processor configured to:
      determine a three dimensional (3D) voxel grid for a 3D model of a target object;
      determine at least one pair of spaced apart grasping positions on the target object at which the target object is capable of being grasped with two hands at the same time based on processing the 3D voxel grid for the target object with a neural network trained to determine grasping positions for two-handed grasps of target objects using training data that includes 3D voxel grids of a plurality of 3D models of training objects and grasping data including corresponding pairs of spaced-apart grasping positions for two-handed grasps of the training objects; and
      provide output data that specifies the determined grasping positions on the target object for two-handed grasps.

2. The system according to claim 1, wherein the neural network is a convolutional neural network.

3. The system according to claim 1, wherein the output data includes a 3D voxel grid that includes voxels with values that specify at least one pair of grasping positions for two-handed grasps,
   wherein the at least one processor is configured to:
      based on the output data cause a display device to output a 3D visual representation of the target object including markings that visually highlight the determined grasping positions for the target object.

4. The system according to claim 1, wherein the at least one processor is configured to receive at least one input through at least one input device of a selection of the target object displayed in a 3D simulation of a factory through a display device, wherein in response to the at least one input, the 3D voxel grid of the 3D model of the target object is determined, the grasping positions are determined, and the output data is provided to enable a visual representation of a person to be depicted in the 3D simulation as grasping and moving the target object with two hands at the determined grasping positions.

5. The system according to claim 1, wherein the at least one processor is configured to:
   provide a user interface via which users are enabled to provide grasping data via inputs through at least one input device corresponding to positions on the plurality 3D models of the training objects corresponding to grasping positions for two-handed grasps; and generate training data including 3D voxel grids for both the 3D models of the training objects and the corresponding user provided grasping data, which are usable to train the neural network to determine grasping positions for two-handed grasps of target objects.

6. The system according to claim 1, wherein for at least some target objects, the corresponding output data specifies at least two different pairs of spaced-apart positions for two-handed grasps.

7. The system according to claim 1, wherein the 3D voxel grids depicting the training objects and the target object include voxels that represent material type, density of material, or any combination thereof based on the material type or density of material specified in the 3D model for the portion of the training object or target object represented by each respective voxel.

8. A method to facilitate determining grasping positions for two-handed grasps of industrial objects comprising:
through operation of at least one processor:
determining a three dimensional (3D) voxel grid for a 3D model of a target object;
determining at least one pair of spaced apart grasping positions on the target object at which the target object is capable of being grasped with two hands at the same time based on processing the 3D voxel grid for the target object with a neural network trained to determine grasping positions for two-handed grasps of target objects using training data that includes 3D voxel grids of a plurality of 3D models of training objects and grasping data including corresponding pairs of spaced-apart grasping positions for two-handed grasps of the training objects; and
providing output data that specifies the determined grasping positions on the target object for two-handed grasps.

9. The method according to claim 8, wherein the neural network is a convolutional neural network.

10. The method according to claim 8, wherein the output data includes a 3D voxel grid that includes voxels with values that specify at least one pair of grasping positions for two-handed grasps,
further comprising based on the output data, causing a display device to output a 3D visual representation of the target object including markings that visually highlight the determined grasping positions for the target object.

11. The method according to claim 8, further comprising through operation of the at least one processor:
receiving at least one input through at least one input device of a selection of the target object displayed in a 3D simulation of a factory through a display device, wherein in response to the at least one input, the 3D voxel grid of the 3D model of the target object is determined, the grasping positions are determined, and the output data is provided to enable a visual representation of a person to be depicted in the 3D simulation as grasping and moving the target object with two hands at the determined grasping positions.

12. The method according to claim 8, further comprising through operation of the at least one processor:
providing a user interface via which users are enabled to provide grasping data via inputs through at least one input device corresponding to positions on the plurality 3D models of the training objects corresponding to grasping positions for two-handed grasps; and
generating training data including 3D voxel grids for both the 3D models of the training objects and the corresponding user provided grasping data, which are usable to train the neural network to determine grasping positions for two-handed grasps of target objects.

13. The method according to claim 8, wherein for at least some target objects, the corresponding output data specifies at least two different pairs of spaced-apart positions for two-handed grasps.

14. The method according to claim 8, wherein the 3D voxel grids depicting the training objects and the target object include voxels that represent material type, density of material, or any combination thereof based on the material type or density of material specified in the 3D model for the portion of the training object or target object represented by each respective voxel.

15. A non-transitory computer readable medium encoded with executable instructions that when executed, cause at least one processor to:
determine a three dimensional (3D) voxel grid for a 3D model of a target object;
determine at least one pair of spaced apart grasping positions on the target object at which the target object is capable of being grasped with two hands at the same time based on processing the 3D voxel grid for the target object with a neural network trained to determine grasping positions for two-handed grasps of target objects using training data that includes 3D voxel grids of a plurality of 3D models of training objects and grasping data including corresponding pairs of spaced-apart grasping positions for two-handed grasps of the training objects; and
provide output data that specifies the determined grasping positions on the target object for two-handed grasps.

16. The non-transitory computer readable medium of claim 15, wherein the output data includes a 3D voxel grid that includes voxels with values that specify at least one pair of grasping positions for two-handed grasps,
wherein the executable instructions, when executed, cause the at least one processor to:
based on the output data cause a display device to output a 3D visual representation of the target object including markings that visually highlight the determined grasping positions for the target object.

17. The non-transitory computer readable medium of claim 15, wherein executable instructions, when executed, cause the at least one processor to receive at least one input through at least one input device of a selection of the target object displayed in a 3D simulation of a factory through a display device, wherein in response to the at least one input, the 3D voxel grid of the 3D model of the target object is determined, the grasping positions are determined, and the output data is provided to enable a visual representation of a person to be depicted in the 3D simulation as grasping and moving the target object with two hands at the determined grasping positions.

18. The non-transitory computer readable medium of claim 15, wherein the executable instructions, when executed, cause the at least one processor to:
provide a user interface via which users are enabled to provide grasping data via inputs through at least one input device corresponding to positions on the plurality 3D models of the training objects corresponding to grasping positions for two-handed grasps; and
generate training data including 3D voxel grids for both the 3D models of the training objects and the corresponding user provided grasping data, which are usable to train the neural network to determine grasping positions for two-handed grasps of target objects.

19. The non-transitory computer readable medium of claim 15, wherein for at least some target objects, the corresponding output data specifies at least two different pairs of spaced-apart positions for two-handed grasps.

20. The non-transitory computer readable medium of claim 15, wherein the 3D voxel grids depicting the training objects and the target object include voxels that represent material type, density of material, or any combination thereof based on the material type or density of material specified in the 3D model for the portion of the training object or target object represented by each respective voxel.

\* \* \* \* \*